(12) United States Patent
Purpura et al.

(10) Patent No.: US 8,528,978 B2
(45) Date of Patent: Sep. 10, 2013

(54) TRANSPORT VEHICLE SEAT BACK WITH INTEGRATED UPRIGHT SLEEP SUPPORT SYSTEM

(75) Inventors: William J. Purpura, Anaheim, CA (US); Paula K. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 13/287,886

(22) Filed: Nov. 2, 2011

(65) Prior Publication Data

US 2013/0106163 A1　May 2, 2013

(51) Int. Cl.
　　*A47C 7/38*　　(2006.01)
　　*A47C 7/54*　　(2006.01)

(52) U.S. Cl.
　　USPC ........... 297/394; 297/392; 297/397; 297/487; 297/488; 248/118

(58) Field of Classification Search
　　USPC ................. 297/392, 393, 487, 488, 394, 397; 248/118
　　See application file for complete search history.

(56) References Cited

U.S. PATENT DOCUMENTS

| | | | | |
|---|---|---|---|---|
| 108,308 A | * | 10/1870 | Warne | 297/393 |
| 245,639 A | * | 8/1881 | Lay | 297/394 |
| 382,949 A | * | 5/1888 | Campbell | 297/393 |
| 951,560 A | * | 3/1910 | Eaton | 297/392 X |
| 1,051,896 A | * | 2/1913 | Kirkpatrick | 297/392 X |
| 1,134,720 A | * | 4/1915 | Bradley | 297/392 X |
| 1,260,929 A | * | 3/1918 | Maxcy | 297/394 |
| 1,579,585 A | * | 4/1926 | Wieder et al. | 297/394 |
| 2,613,725 A | * | 10/1952 | Woodhall | 297/392 X |
| 2,633,906 A | * | 4/1953 | Franz | 297/488 |
| 2,638,293 A | * | 5/1953 | Lindstrom | 297/393 X |
| 2,828,735 A | * | 4/1958 | Thompson | 297/392 X |
| 2,833,554 A | * | 5/1958 | Giorgio | 297/488 X |
| 3,262,716 A | * | 7/1966 | Graham | 297/488 X |
| 3,285,658 A | * | 11/1966 | Cleveland | 297/392 X |
| 3,359,976 A | * | 12/1967 | Laval, Jr | 602/36 |
| 3,544,161 A | * | 12/1970 | Bryden | 297/391 |
| 3,545,789 A | * | 12/1970 | Graham | 297/488 X |
| 3,643,996 A | * | 2/1972 | Carnahan | 297/392 X |
| 3,722,951 A | * | 3/1973 | Ezquerra | 297/488 |
| 3,795,243 A | * | 3/1974 | Miller | 297/393 X |
| 4,102,564 A | * | 7/1978 | Michael | 297/392 X |
| 4,161,946 A | * | 7/1979 | Zuesse | 602/36 |
| 4,182,322 A | * | 1/1980 | Miller | 5/637 |
| 4,183,583 A | * | 1/1980 | Zuesse | 297/393 |
| 4,235,472 A | * | 11/1980 | Sparks et al. | 297/392 |
| 4,249,712 A | * | 2/1981 | DeLong | 248/118 |
| 4,339,151 A | * | 7/1982 | Riggs | 297/397 X |
| 4,560,201 A | * | 12/1985 | Scott | 297/393 |

(Continued)

FOREIGN PATENT DOCUMENTS

WO　　03/042025 A1　　5/2003

*Primary Examiner* — Rodney B White
(74) *Attorney, Agent, or Firm* — Felix L. Fischer

(57) ABSTRACT

A sleep support system incorporates a head cushion having a face relief aperture to receive the nose and chin of a passenger placing his face against the head cushion and a chest cushion attached to the head cushion with a hinged support structure for angular adjustment. The chest cushion receives the passenger's chest in a forward leaning position. Suspension arms are attached to the hinged support structure and extend over the passenger's shoulders for attachment to a seat back frame.

20 Claims, 14 Drawing Sheets

(56) References Cited

U.S. PATENT DOCUMENTS

| | | | | |
|---|---|---|---|---|
| 4,796,913 A | * | 1/1989 | Amabile et al. | 297/488 X |
| 4,900,086 A | * | 2/1990 | Steward | 297/488 X |
| 4,930,808 A | * | 6/1990 | Mikoll et al. | 297/488 X |
| 5,010,898 A | * | 4/1991 | de Kanawati et al. | 128/845 |
| 5,143,420 A | * | 9/1992 | Switlik | 297/488 X |
| 5,219,203 A | * | 6/1993 | Switlik | 297/488 X |
| 5,303,890 A | * | 4/1994 | Carruth | 248/118 |
| 5,314,404 A | * | 5/1994 | Boughner et al. | 602/17 |
| 5,395,158 A | * | 3/1995 | Cordia | 297/393 |
| 5,401,078 A | | 3/1995 | Riach | |
| 5,511,854 A | * | 4/1996 | Cordia | 297/393 |
| 5,582,464 A | * | 12/1996 | Maymon | 297/487 |
| 5,611,601 A | * | 3/1997 | Cowgur | 297/393 |
| 5,645,319 A | * | 7/1997 | Parks, Jr. | 297/392 X |
| 5,806,933 A | | 9/1998 | Tsui et al. | |
| 6,042,185 A | * | 3/2000 | Cowgur | 297/393 |
| 6,209,959 B1 | * | 4/2001 | Meye | 297/393 |
| 6,266,825 B1 | * | 7/2001 | Floyd | 297/393 X |
| 6,270,160 B1 | * | 8/2001 | Blake | 297/393 |
| 6,301,716 B1 | * | 10/2001 | Ross | 297/393 X |
| 6,427,273 B1 | * | 8/2002 | Berke et al. | 248/118 X |
| 6,523,901 B2 | | 2/2003 | Smith | |
| 6,607,245 B1 | | 8/2003 | Scher | |
| 6,619,733 B2 | * | 9/2003 | Pearson | 297/488 X |
| 6,659,319 B2 | | 12/2003 | Purpura | |
| 6,684,431 B2 | * | 2/2004 | Splane, Jr. | 248/118 X |
| 6,721,978 B1 | * | 4/2004 | Tankersley | 297/392 X |
| 6,758,447 B2 | * | 7/2004 | Tinsley | 248/118 |
| 6,796,473 B2 | | 9/2004 | Purpura | |
| 6,805,403 B2 | * | 10/2004 | Buch | 297/146 |
| 6,857,149 B2 | * | 2/2005 | Hoggatt et al. | 5/632 |
| 6,973,691 B1 | | 12/2005 | Cordova et al. | |
| 7,748,064 B2 | * | 7/2010 | Hamilton | 297/394 X |
| 7,909,406 B2 | * | 3/2011 | Samuelsen | 297/397 |
| 8,007,046 B2 | | 8/2011 | Rothschild | |
| 8,011,731 B2 | * | 9/2011 | Goddu | 297/397 |
| 8,042,775 B1 | * | 10/2011 | Gallegos | 248/118 |
| 8,141,955 B1 | * | 3/2012 | Maassarani | 297/393 |
| 8,172,328 B2 | * | 5/2012 | Ferro Montiu | 297/397 |
| 8,287,045 B1 | * | 10/2012 | Donohue et al. | 297/393 |
| 8,333,308 B2 | * | 12/2012 | Maginness | 224/153 |
| 8,381,316 B2 | * | 2/2013 | Edwards | 297/393 X |
| 2002/0067060 A1 | | 6/2002 | Lloyd | |
| 2002/0067063 A1 | * | 6/2002 | Taborro | 297/397 |
| 2003/0172462 A1 | * | 9/2003 | Hoggatt et al. | 5/657 |
| 2004/0026979 A1 | * | 2/2004 | Haddon | 297/393 |
| 2004/0124685 A1 | * | 7/2004 | Buch | 297/393 |
| 2004/0245832 A1 | * | 12/2004 | Miller | 297/393 |
| 2006/0108850 A1 | * | 5/2006 | Miller | 297/393 |
| 2010/0171353 A1 | | 7/2010 | Ferro Montiu | |
| 2011/0043025 A1 | * | 2/2011 | Park | 297/393 |
| 2011/0127391 A1 | * | 6/2011 | McDonald | 248/118 |
| 2012/0068515 A1 | * | 3/2012 | Bogen | 297/393 |
| 2012/0292960 A1 | * | 11/2012 | Guering | 297/393 X |

* cited by examiner

TRANSPORT VEHICLE SEAT BACK WITH INTEGRATED UPRIGHT SLEEP SUPPORT SYSTEM

BACKGROUND INFORMATION

1. Field

Embodiments of the disclosure relate generally to the field of transport system seating and more particularly to an integrated upright sleep support system supported by and stored within the frame of a transport vehicle seat.

2. Background

Vehicle transport seats, such as commercial airline seats, are often occupied by travelers for extended periods of time. Even though many transport seats recline to a certain extent, seating density prevents sufficient declination of the seat back for restful sleep. To accommodate sleeping in a vehicle seat several predominate options exist.

If seated in the window seat, they traveler can lean against the bulkhead and attempt to prop their head up with a pillow. This option is only available to passengers in window seats. Further, the window seats vary by location within the fuselage of the aircraft, and not all window seats are appropriate for this option. In order to utilize this option, the passenger must twist into an awkward pose that may in itself prevent the passenger from attaining a comfortable position or allow the passenger to be easily awakened by the movement of the vehicle. The vibration of the aircraft is more strongly felt by the passenger when leaning against the fuselage. While in the upright sleep position the passenger is more likely to fall forward and react to turbulence.

Alternatively the passenger uses a special neck pillow to support their head while trying to sleep in an upright position. The personal neck pillow, is also not a highly successful option due to the natural tendency of a sleeper to relax their muscles and fall to a more horizontal position, thus awakening the passenger. Many neck pillows use filling materials that shift or deform during use, and/or have non-breathable covers. Further, if an inflatable design, the pillow takes up less room during transport, but requires inflation at the beginning of use and deflation at the end of use.

Finally, the passenger can use the tray table from the seat back in front as a support surface on which they rest an object that raises the surface level to a point that the combination of tray table and object is high enough to support the passenger's arms and/or head as they lean against it for sleeping. This requires the use of the fold down tray table for support and is still only partially successful. This is due to fact that the space available to the passenger is at least partially determined by the person in the seat in front of them. If that person adjusts the angle of their own seat, the passenger leaning on the tray table will be awakened as a result. Additionally, this method, for most adults, requires the use of an object to bring the height of the tray table to the appropriate level. The seat back immediately forward may be reclined to a position leaving no room to place a support on the tray table. Further, depending on the size and composition of the pillow, the passengers carry-on limit may be impacted. If an inflatable version is used it must be inflated and deflated. Additionally, the sleeper will either have their face flat against the support—which is uncomfortable, or will have to twist their head to the side—which can cause neck strain while sleeping. In either case, breathing while sleeping may also be interrupted. Finally, use of this method by a passenger not in the window seat will impact the ability of passengers nearer the window to enter & exit causing them to wake the sleeper. A self supporting version of this option is disclosed in U.S. Pat. No. 6,973,691.

Various prior art devices have also been disclosed for constraining the head of a passenger to a seat head rest as disclosed in U.S. Pat. Nos. 5,806,933, 6,607,245, 6,523,901 and 8,007,046 and published application 20100171353.

It is therefore desirable to provide an integrated system within or attachable to vehicle transport seats for upright support of a seated passenger in a comfortable position for sleep.

SUMMARY

Embodiments disclosed herein provide a sleep support system which incorporates a head cushion having a face relief aperture to receive the nose and chin of a passenger placing his face against the head cushion and a chest cushion attached to the head cushion with a hinged support structure for angular adjustment. The chest cushion receives the passenger's chest in a forward leaning position. Suspension arms are attached to the hinged support structure and extend over the passenger's shoulders for attachment to a seat back frame.

In an exemplary embodiment, a passenger seat in a vehicle has a seat back which incorporates at least part of a headrest joined to at least part of a seat back support cushion which form a unit connected to a frame forming said seat back. The headrest and support cushion unit have a stored location behind and comfortably supporting a passenger which is sitting in the seat. The headrest and cushion unit also has a deployed location in front of the passenger comfortably supporting the passenger when resting forward. The headrest and cushion unit is moveably connected and supported from the stored to deployed position by at least one symmetric pair of pivoting linkage having one end connected to the headrest and cushion unit and an opposite end connected to the seat back frame.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a sleeping support system in which the user's body, particularly their arms, is supported to prevent intrusion on the space of the person in the seat next to them and assures users will not be impacted if the seat in front of them reclines to its maximum range. The deployed sleeping support system cradles the head so the head and neck are fully supported and protected from violent vehicle movement without inhibiting breathing or vision. The sleeping support system adjusts for the user's body type, size and weight for maximum support and comfort while sleeping. The sleeping support system positions to keep the passenger erect, and less extended beyond the forward seat edge, allowing more room for seatmates to pass by a sleeper without waking them. Finally, the sleeping support system provides a very strong attachment to the seat by being designed into the seat; and works with existing seat restraint systems without requiring users to tie into them.

This multifunctionality is accomplished with a cushioned structure that fully supports the passenger's head and body as well as cradles the passenger's arms. The passenger gains full body stabilization and muscle relaxation, combined with an increased protection from unexpected body movement by leaning forward against a cushioned support system supporting both the head and chest, resulting in improved comfort and a significantly enhanced ability to sleep in an upright position. The embodiments disclosed are integratable directly into a transport passenger seat or may be separately stored in an underseat or alternate location, retrieved, expanded and attached to the seat back by mounting to the top of the seat frame.

Figure 1:
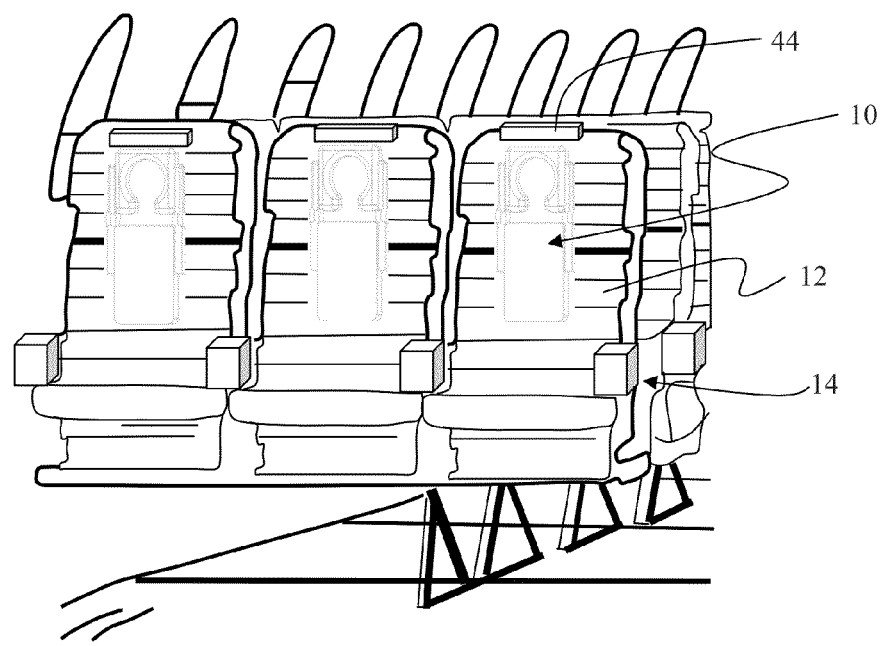
FIG. 1 is a pictorial representation of one embodiment as installed in a transport seat back.
Figure 2A:
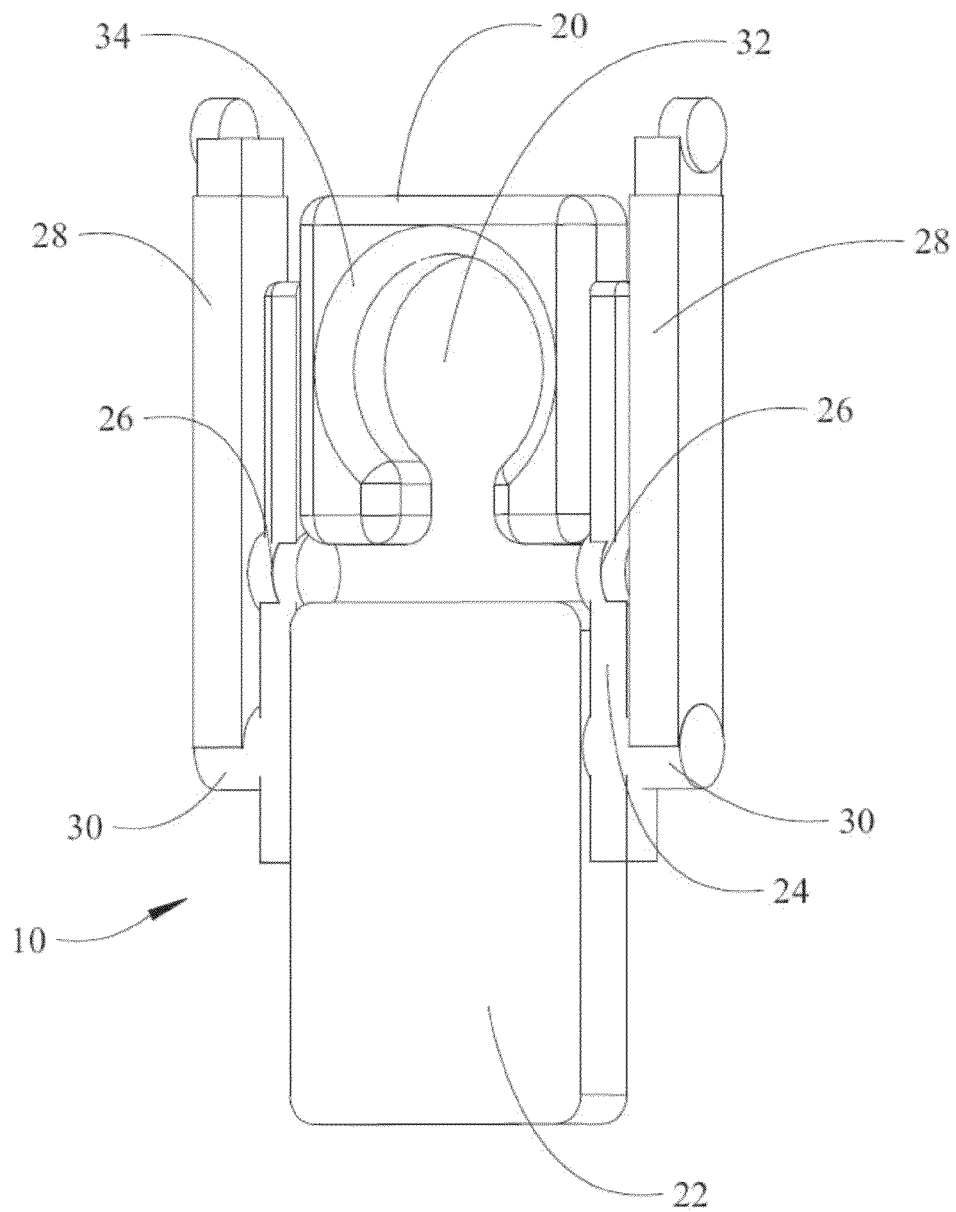
FIG. 2A is a front perspective of an embodiment of the sleep support system in a flattened configuration.
Figure 2B:
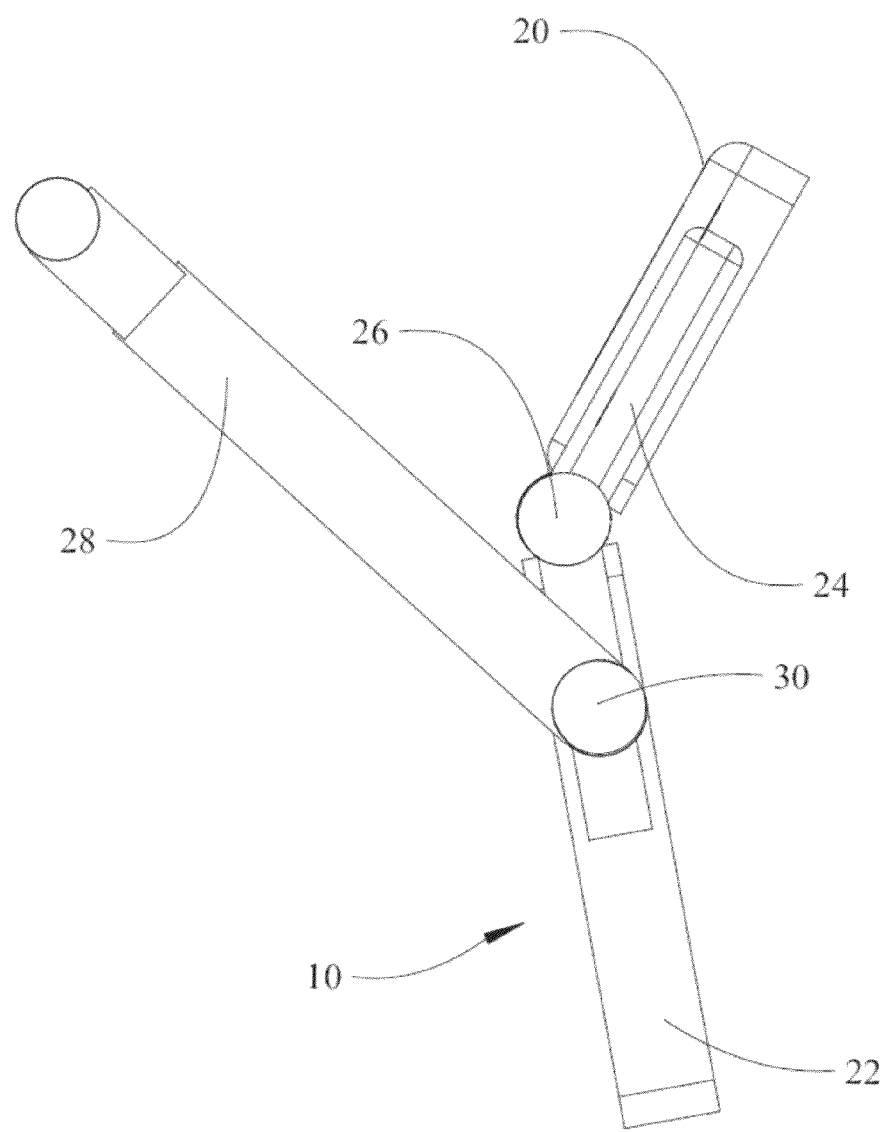
FIG. 2B is a side view of the embodiment of FIG. 2A in a deployed, angled configuration.
Figure 2C:
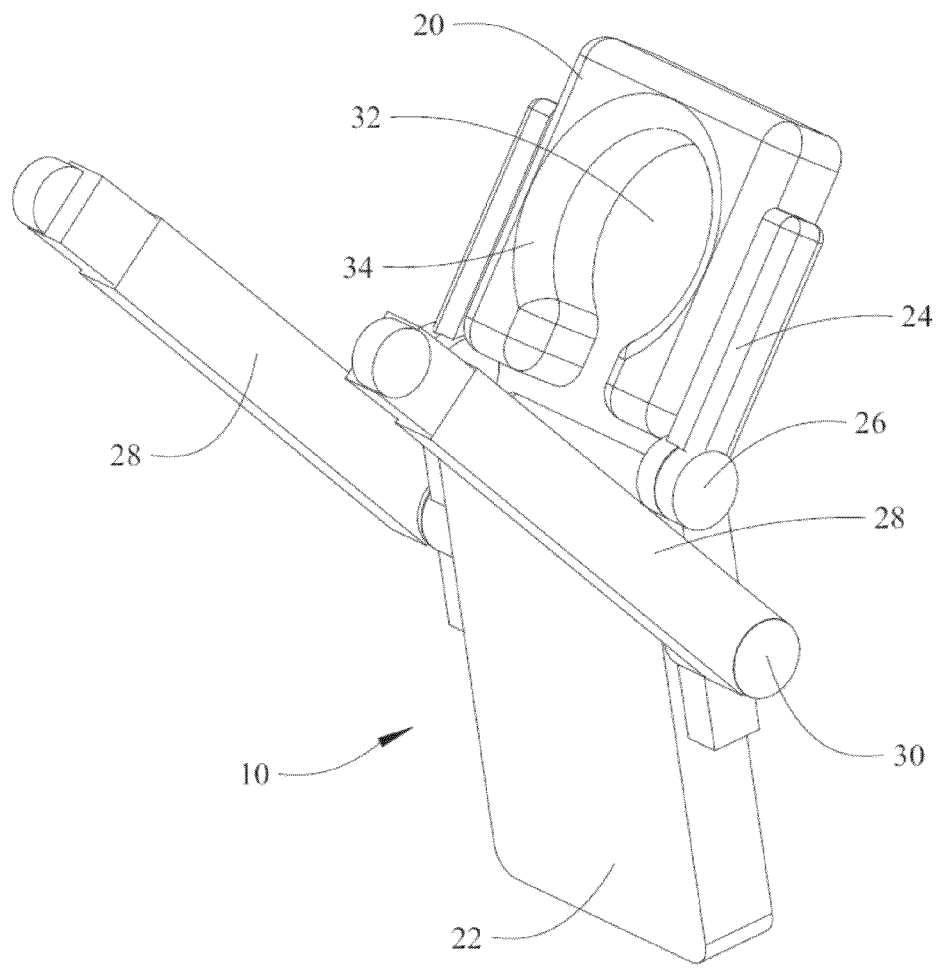
FIG. 2C is a front perspective of the embodiment of FIG. 2B.

FIG. 1 is a pictorial representation of an exemplary embodiment of the sleep support system 10 integrated into seat backs 12 (with covering fabric or padding layers to conceal the unit in the seat back removed for clarity) in standard airline row seating configurations 14. Details of the sleep support system 10 are shown in FIGS. 2A, 2B and 2C. Two cushioning elements are provided; a head, cushion 20 and a chest cushion 22. Both sides of the cushioning elements may have soft surfaces to allow their use as a portion of the normal seat cushion in the stored position shown in FIG. 1. The flat stored configuration of the cushions is shown in FIG. 2A. The head cushion 20 and chest cushion are attached with a hinged side structure 24 to allow the angle between the head cushion and chest cushion to be adjusted as shown in FIGS. 2B and 2C. Hinges 26 may be self locking or may include a lever lock mechanism or similar device which is loosened to alter the angle between the cushions and then tightened to lock the cushions at the desired angle. Hinges described herein may be double hinges. Suspension arms 28 are attached to the side structure 24 with hinges 30 to suspend the sleep support system from the seat as will be described in greater detail subsequently. The symmetrically paired hinged suspension arms 28 and side structure 24 provide a linkage for easy deployment of the sleep support system and attachment to the seat back structure. While shown in the example embodiment of FIGS. 2A-2C as rigid elements, the suspension arms 28 may be flexible straps or cables in alternate embodiments.

The head cushion incorporates a cutout 32 which accommodates the nose, eyes and chin of the passenger while supporting the forehead and cheeks in a relieved circumferential portion 34. While shown as substantially circular for the embodiment in FIGS. 2A-2C, the cutout may be ovaloid, triangular, rectangular or multi-lateral in alternative embodiments. Chest cushion 22 supports the chest at an angle adjusted to conform to the anatomical features of the passenger accommodating slim or more robust chest and stomach features and allowing the passenger to lean forward against the chest cushion that comfortably supports the weight of the passenger. The adjustability of hinges 26 allows a comfortable angle to be established between the chest and head for complete support of the passenger in a forward resting position. In certain embodiments, the suspension arms may be telescoping and double hinged as shown in the drawings both for compact storage capability and to allow extension for varying forward angles of support for the torso of the passenger.

Figure 3A:
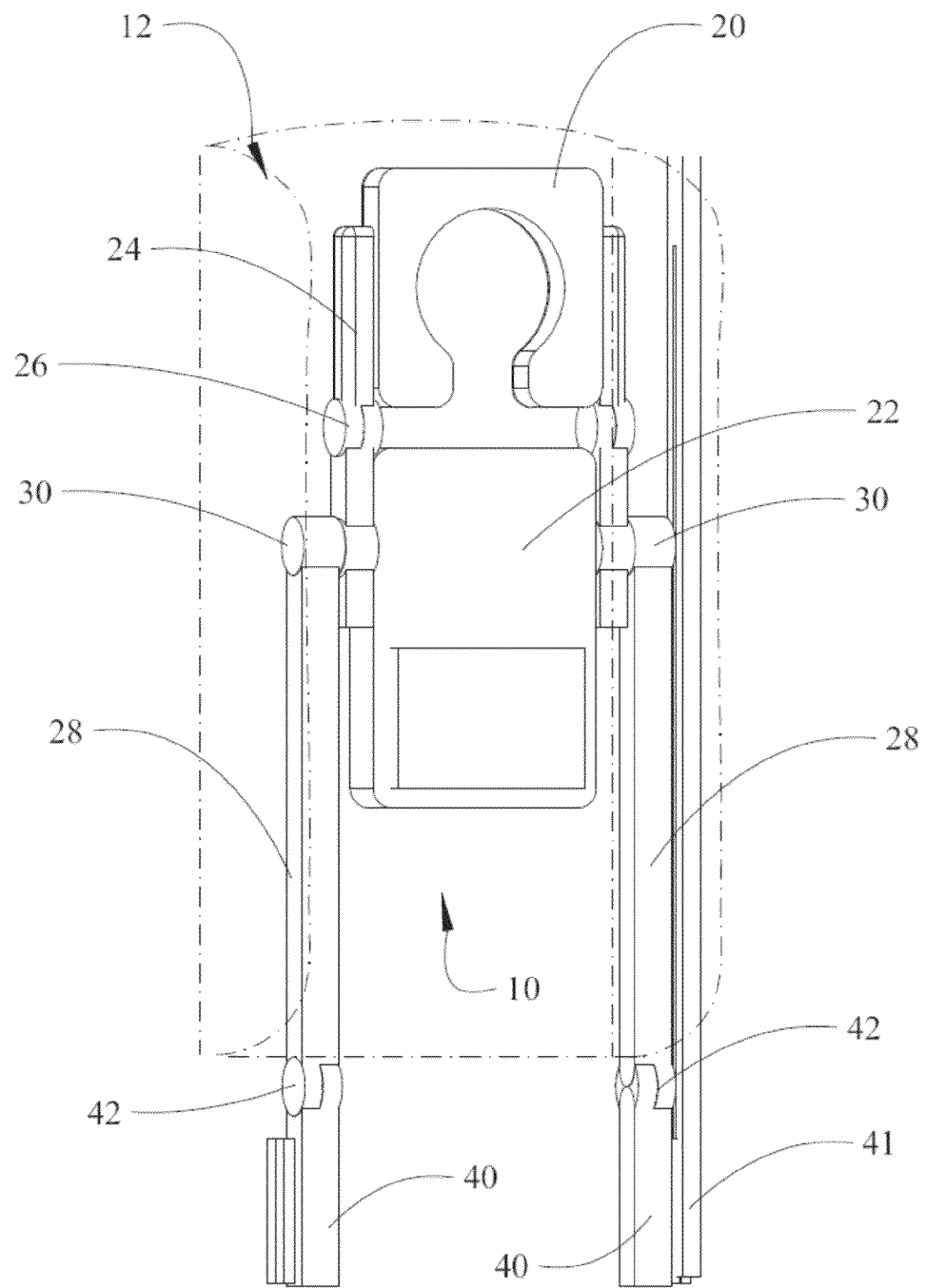
FIG. 3A is a first front perspective of the sleep support system as stored in a seat back.
Figure 3B:
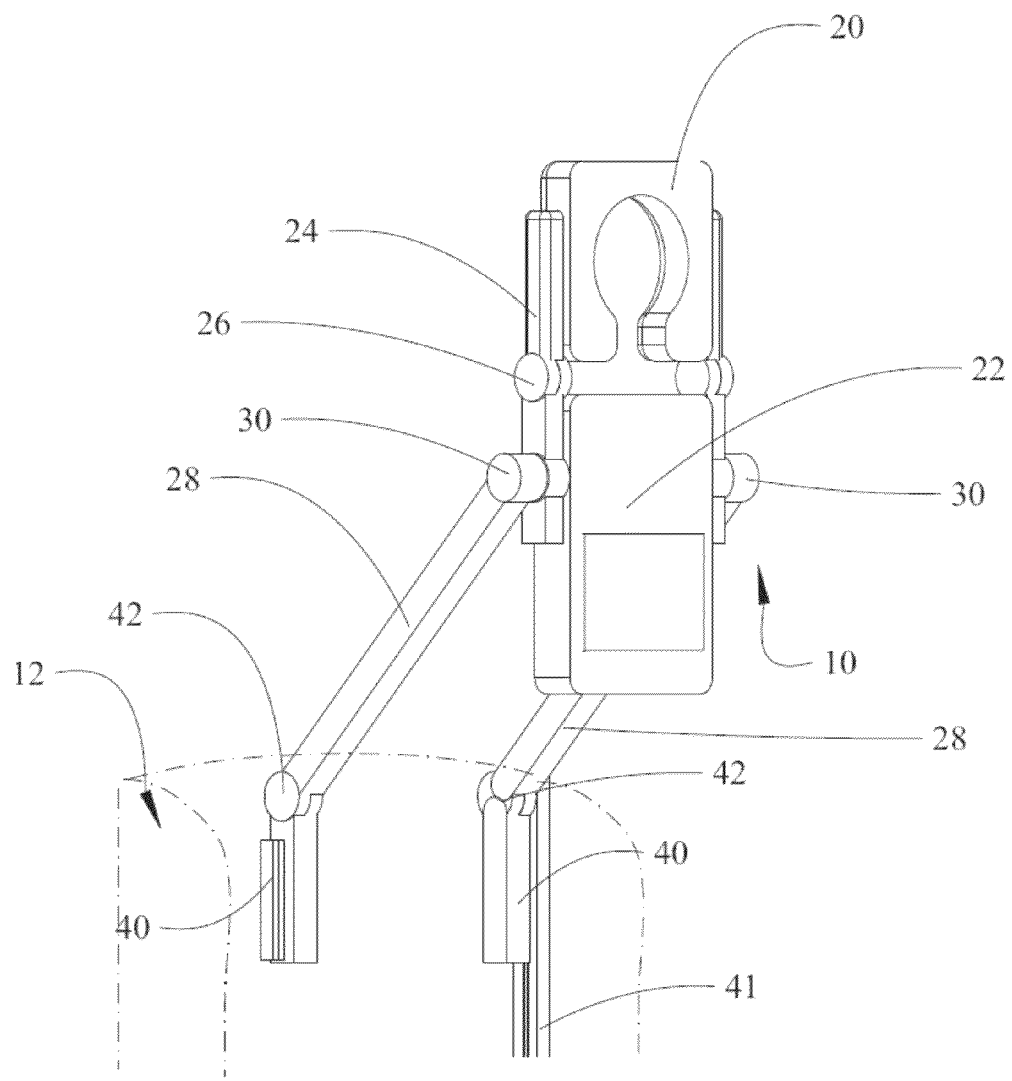
FIG. 3B is a second front perspective of the embodiment of FIG. 3A extracted from the seat back.
Figure 3C:
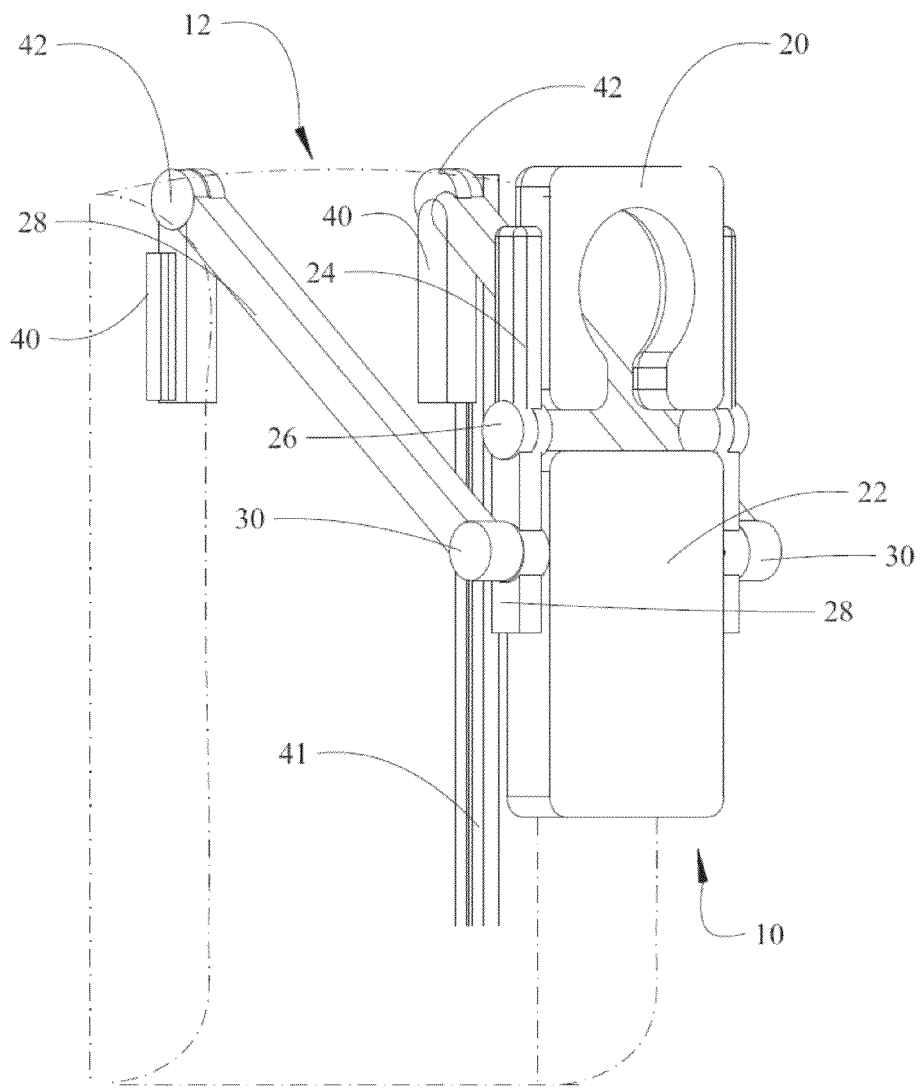
FIG. 3C is a third front perspective of the embodiment of FIG. 3A in a declined position.
Figure 3D:
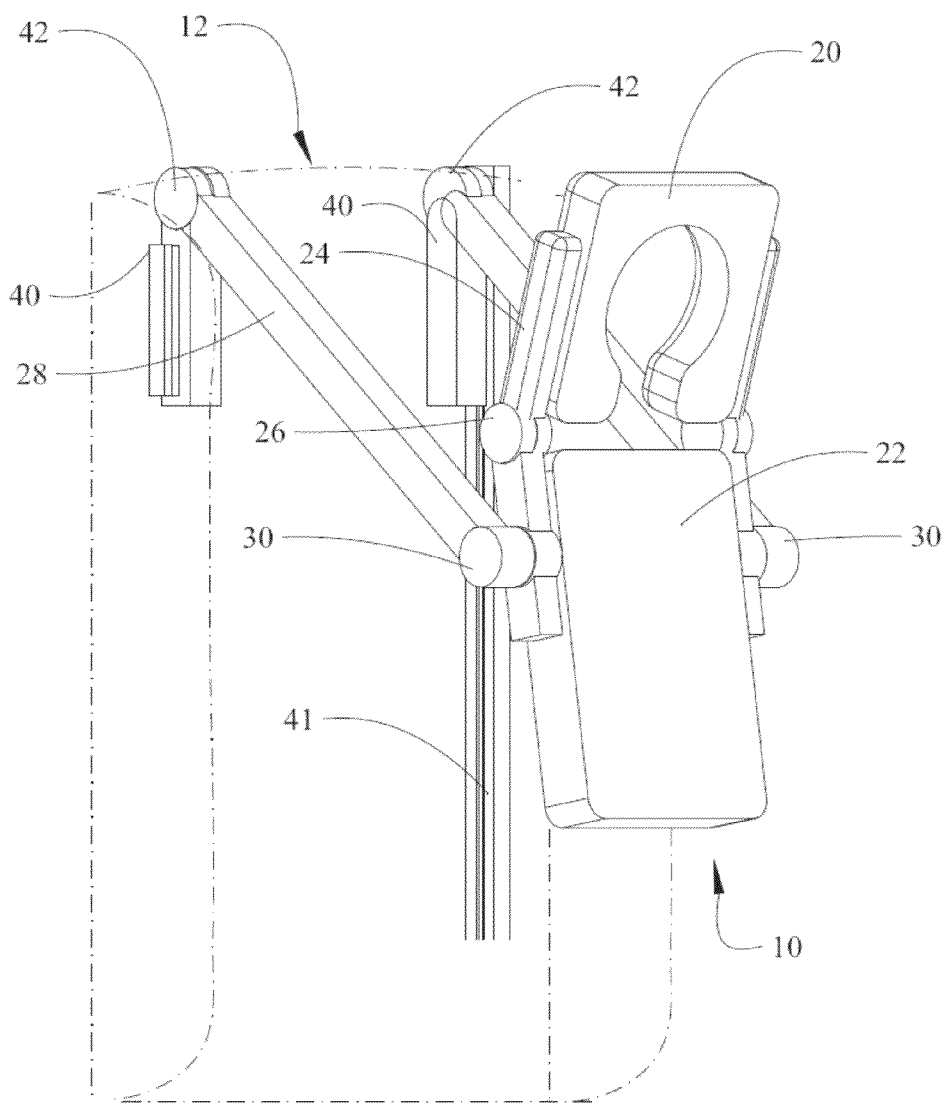
FIG. 3D is a fourth front perspective of the embodiment of FIG. 3A in a folly deployed position.
Figure 3E:
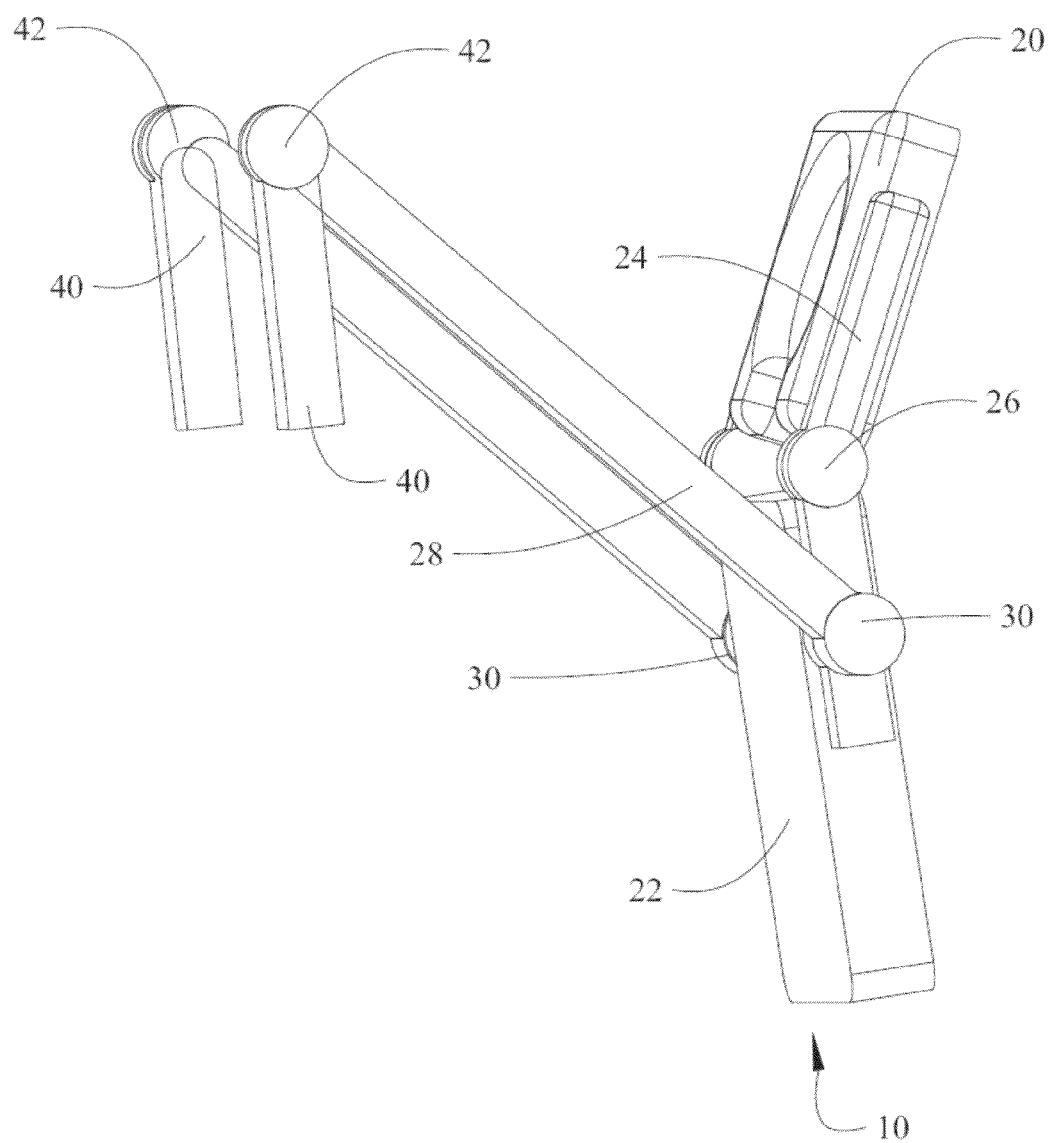
FIG. 3E is a side perspective view of the embodiment of FIG. 3A in the fully deployed position.
Figure 3F:
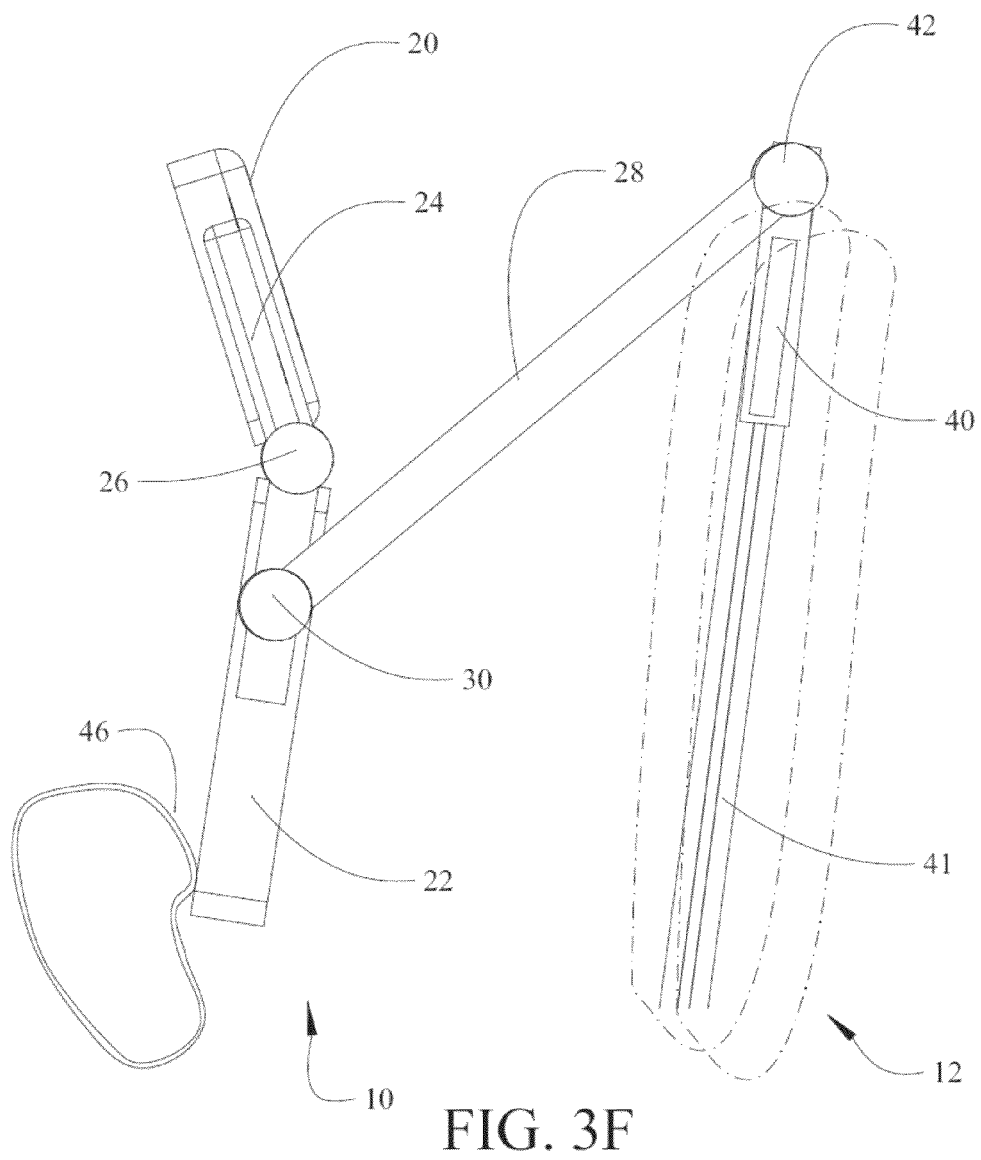
FIG. 3F is a side view of the embodiment of FIG. 3A in the fully deployed position.

One operational scenario for the seat back stored embodiment is described with respect to FIGS. 3A-3F. As shown in FIG. 3A, the sleep support system 10 is stored in the seat back 12 (shown in phantom for clarity) in a substantially vertical position with the head cushion 20, chest cushion 22, side structure 24 and suspension arms 28 substantially aligned. Suspension arms 28 terminate in support legs 40 which are coupled to the suspension arms with knee joints 42. The support legs 40 engage tracks 41 in the seatback frame structure for reciprocal motion out of and into the seat back (only one track on one side is shown in FIGS. 3A-3F for clarity of the other components). For deployment, the sleep support system 10 is extracted vertically through channel or aperture 44 (best seen in FIG. 1) in the top of the seat back until the knee joints 42 are operably exposed above the seat back (nominally above the shoulders of the passenger allowing the suspension arms to rotate forward as shown in FIG. 3B. This allows the head cushion 20 and chest cushion 22 with integral side support structure 24 pivoting on hinges 30 to be passed over the head of the passenger and suspension arms to decline over the shoulders of the passenger to be positioned as shown in FIG. 3C. The desired angle of the head cushion 20 and chest cushion 22 may then be established with hinges 26 in the side structure 24 as shown in FIGS. 3D and 3E. As shown in FIG. 3F, with the head, and chest cushions positioned comfortably, a flexible arm rest pouch 46 is extracted from the back of the chest cushion 22 allowing the arms to be inserted and supported for restful sleep. For storage, the arm rest pouch may be affixed to the back of the chest cushion with hook and loop fasteners or the like or stored in a recess in the chest cushion back with a zipper or hook and loop cover flap.

Figure 4A:
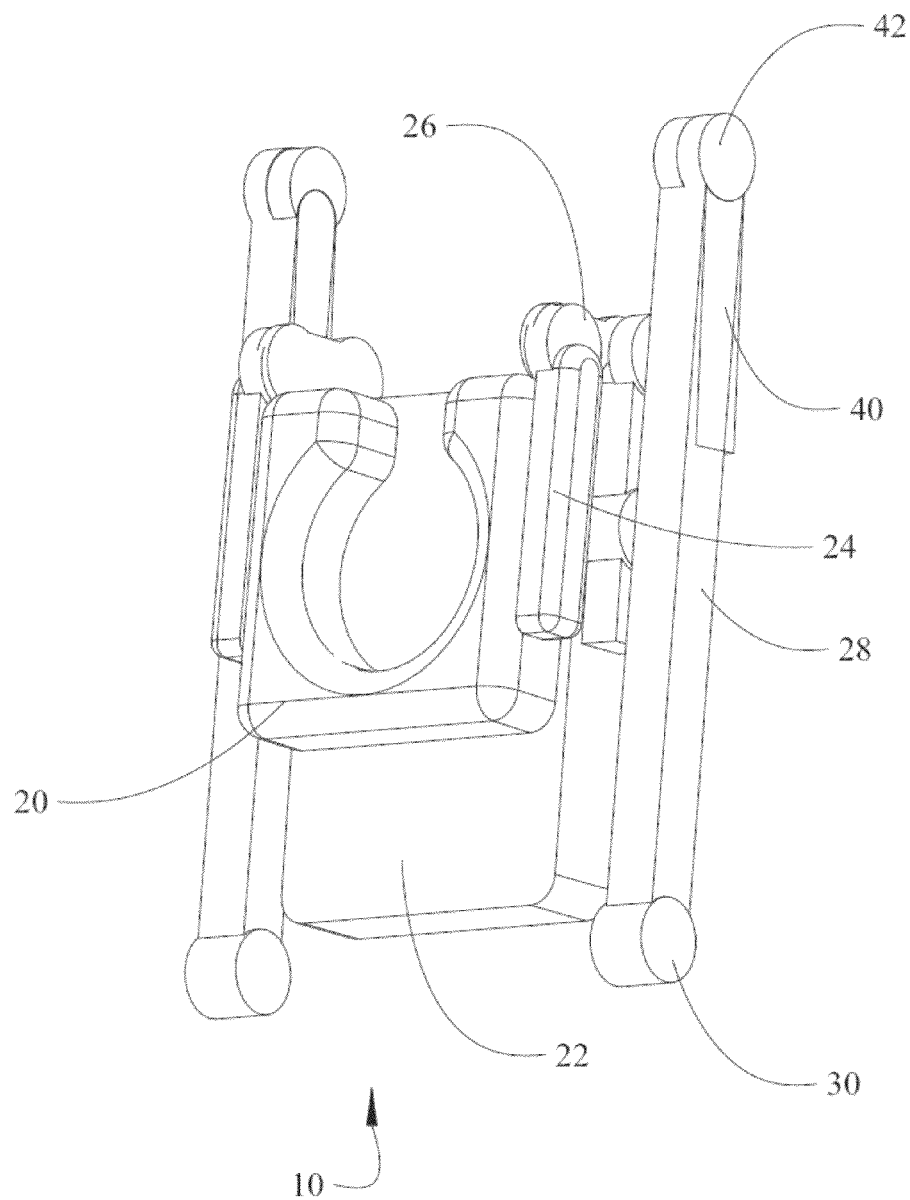
FIG. 4A is a front perspective of an alternative embodiment in a folded storage position.
Figure 4B:
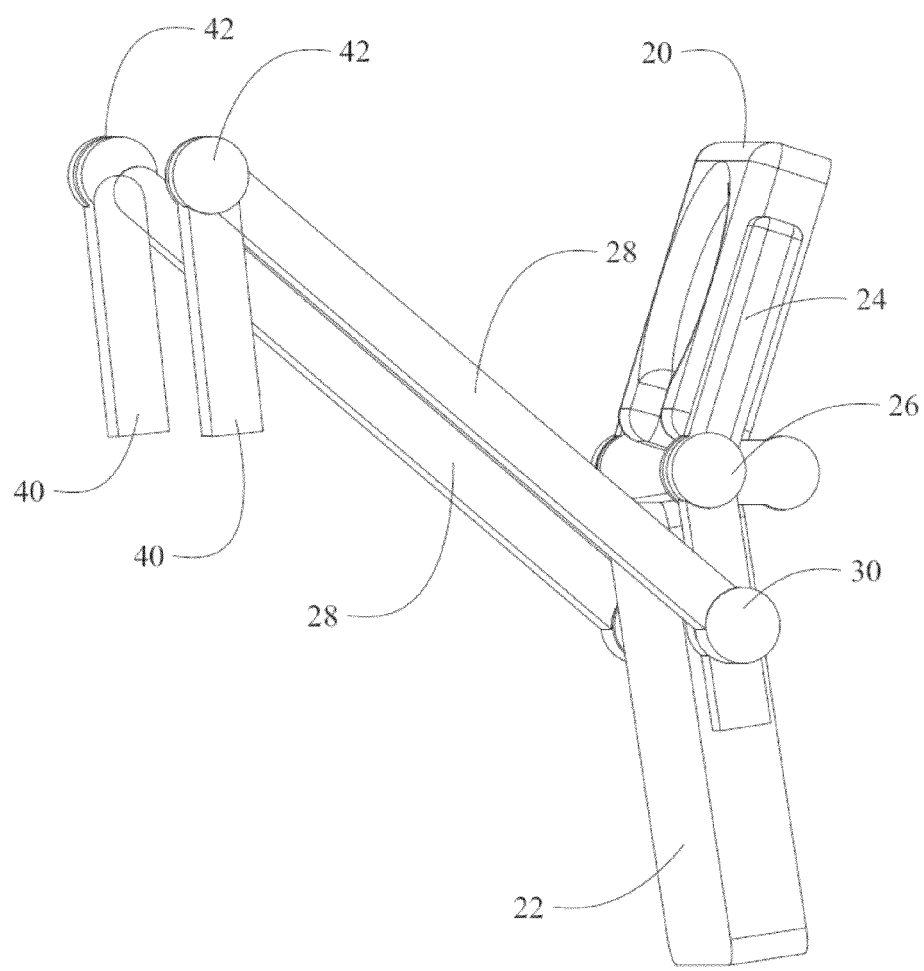
FIG. 4B is a side perspective of the alternative embodiment in the deployed position.
Figure 4C:
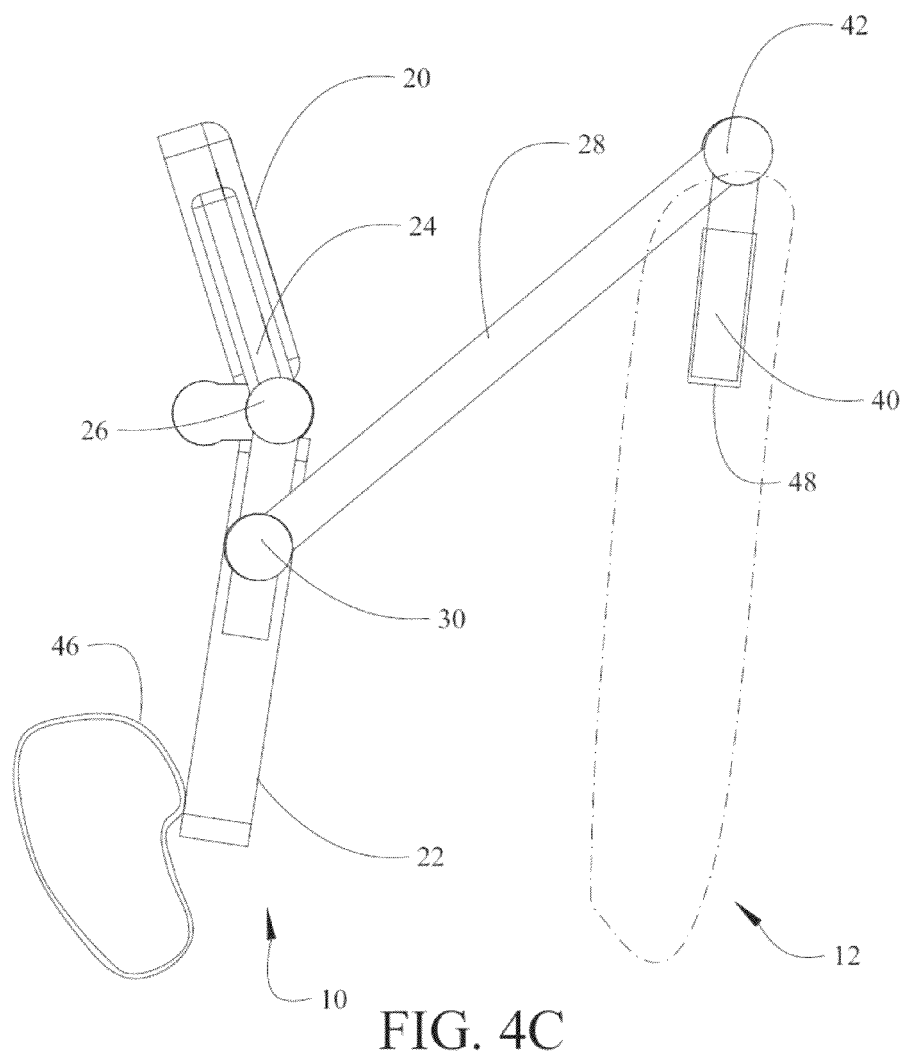
FIG. 4C is a side view of the alternative embodiment in the deployed position; and, FIG. 5 is a front perspective view of an alternative embodiment with a strap attachment arrangement.

In an alternative embodiment, the sleep support system may be stored in an underseat container or in an overhead bin or similar location in a folded condition as shown in FIG. 4A and unfolded to a deployed configuration as shown in FIG. 4B with the suspension arms 28 extending from the side support structure 24. Support legs 40 depending from the suspension arms 28 may then be inserted into receiving channels 48 in the top of seat back 12 as shown in FIG. 4C providing a comparable fully deployed structure to that of the embodiment as shown in FIG. 3F. Various telescoping and slotted engagement arrangements between the structural elements of the embodiment may be employed to provide the necessary folding arrangement for compact storage while providing sufficient rigidity in the extended positions for adequate support of the passenger upon deployment.

Figure 5:
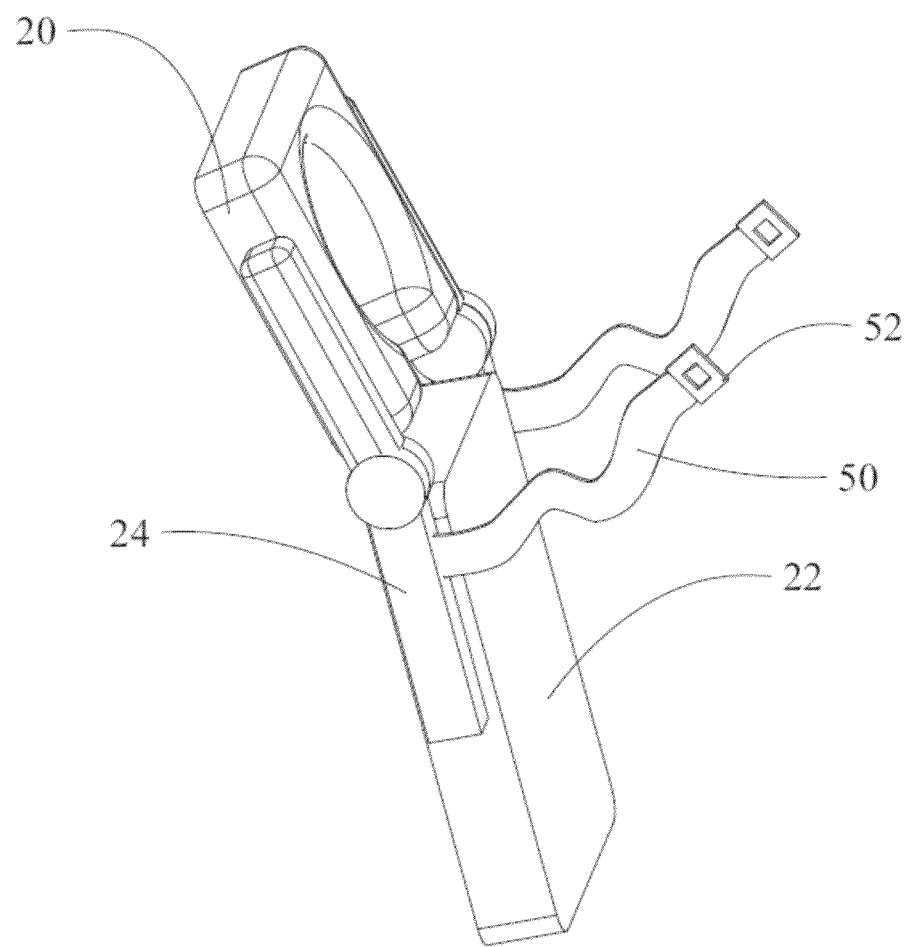

Additionally, sleep support systems stored under the seat or in alternative locations can eliminate the suspension arms 28 and be attached simply by the use of adjustable straps 50 attached to the side support structure 24 as shown in FIG. 5 with the straps having buckle ends 52 to be secured into support holes or buckles formed in the top of the seat. The sleep support system may be stored in the underseat compartment with the head cushion, chest cushion and support structure folded. The sleep support system is then withdrawn from the underseat compartment and the head cushion and chest cushion unfolded. The support structure is then attached to a seat back with the flexible straps and the head cushion and chest cushion are placed in front of the passenger to receive the passenger's face and chest.

In alternative embodiments, the straps may be extracted from retracting rollers in the seat back support cushions and attached to the side support structure. The sleep support system side support structure may employ mating buckles to receive the straps or slots through which the straps are inserted and then passed downward between the passenger's legs and attached to receiving buckles under the bottom of the seat. In alternative embodiments, the sleep support system may be extracted from the underseat storage with the attaching strap extending upward through the legs and then extending from the side support structure for attachment to the top of the seat back.

For the underseat embodiment as described, the head cushion 20 and/or the chest cushion 22 may be inflatable to allow more compact storage.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A passenger seat in a vehicle with a seat back comprising:
   at least part of a headrest joined to at least part of a seat back support cushion, and both forming a unit connected to a frame forming said seat back,
   said headrest and cushion unit having a stored location behind and comfortably supporting a passenger which is sitting,
   where said headrest and cushion unit also having a deployed location in front of said passenger comfortably supporting said passenger when resting forward, where said headrest and cushion unit is moveably connected and supported from the stored to deployed position by at least
   one pair of symmetrical pivoting linkages on opposite sides of the headrest and seat cushion unit, said linkages having one end connected to said headrest and cushion unit and an opposite end connected to said seat back frame.

2. The passenger seat as defined in claim 1 further comprising a joint which joins and pivotably adjusts the headrest relative to the cushion.

3. The passenger seat as defined in claim 1 further comprising a comfort padding on front and back sides of said unit.

4. The passenger seat as defined in claim 1 further comprising an arm support pouch which is attached to said cushion at a bottom of said cushion and is configured to support both arms of a passenger when said unit with pouch is deployed.

5. A sleep support system comprising:
   a head cushion having a face relief aperture to receive the nose and chin of a passenger placing his face against the head cushion;
   a chest cushion attached to the head cushion with a hinged support structure for angular adjustment, said chest cushion receiving the passenger's chest in a forward leaning position; and
   suspension arms attached to the hinged support structure and extending over the passenger's shoulders for attachment to a seat back frame.

6. The sleep support system of claim 5 wherein the hinged support structure comprises a pair of side supports attached to the head cushion arid chest cushion and each having a hinge intermediate the head cushion and chest cushion.

7. The sleep support system of claim 6 wherein the suspension arms are connected to support legs at hinged knees, said support legs reciprocally received in mating tracks adapted to be attached to the seat back frame.

8. The sleep support system of claim 7 wherein said suspension arms and support legs are aligned in a first position and retractable along said mating tracks in a stored position.

9. The sleep support system of claim 8 wherein said suspension arms and support legs are angled in a second position when extended on said mating tracks in a deployed position.

10. The sleep support system of claim 6 wherein the suspension arms are connected to support legs at hinged knees, said support legs received in mating channels adapted to be attached to the seat back frame.

11. The sleep, support system of claim 10 wherein the head cushion and chest cushion are foldably collapsible and the suspension arms and support legs are foldable for compact storage.

12. The sleep support system of claim 5 wherein the suspension arms are telescoping.

13. The sleep support system of claim 5 further comprising an arm support pouch attached to said chest cushion.

14. The sleep support system of claim 5 wherein the suspension arms are flexible straps.

15. The sleep support system of claim 14 wherein the head cushion and chest cushion are foldably collapsible for compact storage.

16. The sleep support system of claim 14 in which the flexible straps terminate in buckle ends for mating attachment to the seat back frame.

17. A method for deployment of a sleep support system having a head cushion, a chest cushion hingedly connected to the head cushion with a support structure and suspension arms connected to the support structure and terminating in support legs attached at knee joints, said method comprising:
   storing the sleep support system in a seat back with the head cushion, chest cushion, support structure, suspension arms and support legs substantially aligned;
   withdrawing the sleep support system upward from the seat back to expose the knee joints; and
   declining the suspension arms by rotation at the knee joints over a passenger's shoulders to place the head cushion and chest cushion in front of the passenger to receive the passenger's face and chest.

18. The method of claim 17 further comprising adjusting the angle between the head cushion and chest cushion.

19. The method of claim 17 further comprising deploying a flexible arm pouch from the chest cushion to receive the passenger's arms.

20. A method for deployment of a sleep support system having a head cushion, a chest cushion hingedly connected to the head cushion with a support structure and flexible suspension straps connected to the support structure, said method comprising:
   storing the sleep support system in a vehicle compartment with the head cushion, chest cushion and support structure folded;

withdrawing the sleep support system from the under-seat compartment and unfolding the head cushion and chest cushion and attaching the support structure to a seat back with flexible straps; and placing the head cushion and chest cushion in front of the passenger to receive the passenger's face and chest.

\* \* \* \* \*